United States Patent Office 2,857,380
Patented Oct. 21, 1958

2,857,380

DIQUATERNARY AMMONIUM SALTS OF 2 AMINO ETHYL 5 AMINO 3 PENTENYL ETHER

Warren D. Niederhauser, Huntsville, Ala., assignor to Rohm & Haas Company, Philadelphia, Pa., a corporation of Delaware No Drawing. Application November 28, 1955
Serial No. 549,552

13 Claims. (Cl. 260—247.5)

This invention relates to diquaternary ammonium compounds having the formula

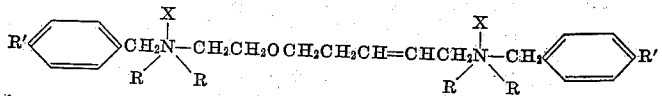

in which X is preferably a halogen having an atomic weight between about 35.5 and 127, R' is an alkyl group of six to eight carbon atoms, and the R groups, taken individually, represent alkyl groups of no more than two carbon atoms and, taken collectively in proximate pairs, represent a divalent saturated aliphatic chain of four to five atoms which jointly with the proximate amino nitrogen forms a five- to six-sided monoheterocyclic amine. Divalent in the above sense is to be construed to mean α,ω-divalency, that is, one valence at each end of the chain. This invention, also, concerns a method of preparation for these compounds.

The symbol X is preferably chlorine, bromine, or iodine. Chlorine is the preferred representation of X. It is, also, satisfactory to use other anions such as sulfate, methylsulfate, phosphate, acetate, citrate, tartrate, and the like, which may be supplied directly or by metathesis with the halide form of the present compounds or by the use of an anion-exchange resin. Generally, an anion having a group weight of up to about 127 is desired.

The symbol R' represents an alkyl group of six to eight carbon atoms, that is, hexyl, heptyl, or octyl. The R' groups may be straight or branched chains in any of the known configurations. For instance, the octyl group may be n-octyl, isooctyl, tert-octyl, 2,4-dimethylhexyl, 1,6-dimethylhexyl, 1,1,3,3-tetramethylbutyl, 3-ethylhexyl, 3-propylpentyl, 2-methyl-4-ethylpentyl, and the like. The R' group is preferably in the para position on the benzene ring with respect to the methyl ring group, but it may satisfactorily be in the ortho or meta position. One or more lower alkyl substituents, such as methyl, ethyl, and the like, may be positioned on the aromatic ring of the benzyl group.

The R groups, taken singly, represent alkyl groups of no more than two carbon atoms, that is, methyl or ethyl groups, in which case the R groups may be the same or different. The R groups, taken collectively and in conjunction with the amino nitrogen, represent such groups as morpholino, thiamorpholino, pyrrolidinyl, or piperidino, and these groups having a lower alkyl substituent, such as a methyl or ethyl group. Of course, the R groups, when considered collectively, are to be considered in pairs about the nitrogen atom they have in common.

The diquaternary ammonium compounds of this invention may be prepared preferably in one of two equally satisfactory ways. In one case an alkylbenzyl halide is reacted with a dialkylaminoethyl dialkylaminopentenyl ether and, alternatively, an alkylbenzyldialkylamine is reacted with a haloethyl halopentenyl ether. The choice of either method is purely a matter of convenience. Both methods are conducted under essentially the same conditions. The reactants unite in a molecular ratio of two-to-one of the alkylbenzyl reactant to the ether reactant to produce substantially quantitative results.

The reactants employed in the present invention are known or prepared by known methods. Illustrative of this, the ether reactants may be made as shown in the following preparations in which parts by weight are used.

PREPARATION A

There are added to a reaction vessel 241.5 parts of ethylene chlorohydrin and then 90 parts of paraformaldehyde. Hydrogen chloride is passed through the reaction mixture, while the temperature is maintained at —40° C., until no more is absorbed. The mixture is allowed to separate into layers, the water layer separating on top of the organic layer containing the formed ether. There are added to the separated organic layer 12 parts of zinc chloride. The mixture is saturated with butadiene while the temperature is held at 0° to 10° C. The reaction mixture is maintained at 0° to 10° C. for an additional hour and then neutralized with 200 parts of cold saturated sodium carbonate solution, washed with water, and distilled at 64° to 70° C. at 0.2 mm. pressure to give 2-chloroethyl 5-chloro-3-pentenyl ether.

PREPARATION B

A mixture of 50 parts of 2-chloroethyl 5-chloropentenyl ether, 150 parts of aqueous 25% dimethylamine, and 22.4 parts of sodium hydroxide is heated at 100° C. for six hours in an agitated autoclave. The mixture is allowed to cool to room temperature and the aqueous layer is saturated with potassium carbonate. The organic layer is separated and distilled at 89° to 90° C. at 0.8 mm. pressure to give dimethylaminoethyl dimethylaminopentenyl ether. The other ether reactants may be prepared in a similar way.

Typical of the reactants that may be used in the present invention, when an alkylbenzyldialkylamine is reacted with a haloethyl halopentenyl ether, include octylbenzyldimethylamine, octylbenzyldiethylamine, hexylbenzyldimethylamine, heptylbenzylmethylethylamine, hexylbenzylmorpholine, heptylbenzylpyrrolidine, octylbenzylpiperidine, octylbenzylthiamorpholine, 2-chloroethyl 5 - chloro - 3 - pentenyl ether, 2-bromoethyl 5-bromo-3-pentenyl ether, 2-chloroethyl 5-iodo-3-pentenyl ether, 2-bromoethyl 5-iodo-3-pentenyl ether, 2-iodoethyl 5-chloro-3-pentenyl ether, and 2-bromoethyl 5-chloro-3-pentenyl ether. When an alkylbenzyl halide is reacted with a dialkylaminoethyl dialkylaminopentenyl ether, typical reactants include hexylbenzyl chloride, heptylbenzyl chloride, octylbenzyl chloride, octylbenzyl bromide, octylbenzyl iodide, 2-dimethylaminoethyl 5-dimethylamino-3-pentenyl ether, 2-diethylaminoethyl 5-dimethylamino-3-pentenyl ether, 2-dimethylaminoethyl 5-diethylamino-3-pentenyl ether, 2-morpholinoethyl 5-dimethylamino-3-pentenyl ether, 2-pyrrolidinylethyl 5-diethylamino-3-pentenyl ether, 2-piperidinoethyl 5-methylethylamino-3-pentenyl ether, 2-dimethylaminoethyl 5-morpholino-3-pentenyl ether, 2-diethylaminoethyl 5-piperidino-3-pentenyl ether, 2-methylethylaminoethyl 5-pyrrolidinyl-3-pentenyl ether, and 2-methylethylaminoethyl 5-methylethylamino-3-pentenyl ether.

The present reaction is readily consummated by bringing the reactants together at a reacting temperature, usually in the range of about 50° to 150° C., with the range of about 60° to 125° C. being preferred. It is often advantageous to use the reflux temperature of the reaction mixture when solvents are employed. Reflux temperatures of up to about 225° C. and above are practical. The alkylbenzyl reactant is supplied to the reaction mixture preferably in a two-to-one or greater ratio with respect to the ether reactant.

An inert volatile solvent may be advantageously employed, if desired. Suitable in this respect are water, benzene, toluene, xylene, isopropanol, butanol, isopropyl ether, acetonitrile, nitromethane, dimethylformamide, and the like, and mixtures thereof.

Reaction times of about two to twenty-four hours are generally employed depending largely on the reaction temperature, solvent, and individual reactants used. The time of reaction is not critical but may merely influence the yield. As will be apparent to one skilled in the art, the longer reaction times generally favor higher yields, up to a point, and, of course, some reactants unite more speedily than others. In order to assure completeness of reaction and concurrent substantially quantitative results, if desired, there may be determined the amount of ionizable halide formed in the reaction mixture. When the theoretical amount of ionizable halide is present, the reaction is complete. At the conclusion of the reaction any solvent used is removed preferably by distillation, preferably under reduced pressure. The product is preferably extracted and washed with hexane, heptane, or the like, to remove any unused starting materials and then isolated by removing volatile components, preferably under reduced pressure or on a steam bath. If purification of the product is desired, such can be achieved by recrystallization from a suitable solvent such as ethyl acetate.

It is possible, and frequently advantageous, in the preparation of some of the instant compounds to first prepare the halide form, such as chloride, in a manner already set forth, and then prepare any other desired form within the present definition by metathesis or ion-exchange methods. For instance, any of the present compounds in halide form may be converted to the hydroxide form through the use of silver oxide, or the like, and then converted to any desired form by acidifying with an acid of choice such as sulfuric, phosphoric, acetic, and others within the range and spirit of this invention. As an alternative, an anion-exchange resin may be employed. Any of the present compounds, in halide or hydroxide form, may be converted to any desired anion form through the use of an anion-exchange resin in the desired anion form. For instance, there may be used an insoluble, cross-linked, styrene-divinylbenzene copolymeric quaternary ammonium salt in its sulfate, phosphate, or the like, form to convert a present compound in halide or hydroxide form to a desired form, such as sulfate, phosphate, and the like.

The diquaternary ammonium compounds of this invention are generally white to gray waxy or solid materials that are excellent bactericides particularly against *Micrococcus pyogenes* var. *aureus* and *Salmonella typhosa* as determined by standard phenol coefficient tests. The present compounds give values in the range of about 700 to 1050 and above against *Salmonella typhosa* and 480 to 770 and above against *Micrococcus pyogenes* var. *aureus*. For instance, the instant compound having the formula

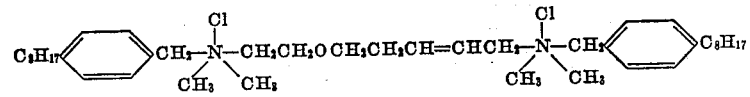

gave a value of 885 against *Salmonella typhosa* and 500 against *Micrococcus pyogenes* var. *aureus*. Similar results are obtained with the other compounds of this invention. The present compounds, also, exhibit strong bacteristatic and bactericidal activity toward *N. catarrhalis*, *S. fecalis*, and *B. suis*, among others, in a wide range of dilutions.

The compounds of this invention are useful fungicides, especially when applied against *Stemphylium sarcinaeforme* and *Monilinia fructicola*, even in dilutions down to ½ ounce in 100 gallons of water and lower. These compounds are good surface-active and cation-active wetting, dispersing, and emulsifying agents.

The present diquaternary ammonium compounds are useful as premise sanitizers where they may be employed in concentrations of about 0.1 to 2.0% in aqueous solutions. These compounds, in aqueous solution in amounts of about 0.5 to one ounce to one hundred pounds of dry fabric, are excellent as a final diaper rinse to prevent diaper rash. The present compounds are valuable as detergent-sanitizers, such as in meat plants to sanitize cutting tables, grinders, and the like; in fruit processing operations, for instance, to wash and sanitize lemons, limes, oranges, and grapefruit; and in dairy farms to sanitize dairy equipment and utensils.

A suitable detergent-sanitizer formulation for use in meat plants includes, by weight, 5% of a compound of this invention, 2.5 to 5.0% of octylphenoxypolyethoxyethanol, 20 to 40% soda ash, 20 to 40% sodium metasilicate, and the remainder sodium tripolyphosphate. One ounce of this formulation is used per gallon of water. For sanitizing citrus fruit there is preferably used one part of a present compound in 5000 parts of water. For use in dairy farms, there may be employed 10% of a diquaternary ammonium compound of this invention, 10% of octylphenoxypolyethoxyethanol, 7% of trisodium phosphate, and 73% of water. One ounce of this solution is used per four gallons of water.

The present compounds are useful as bactericides even in hard water where they do not suffer the impairment of activity so common to most quaternary ammonium compounds. They further have advantageous solubility characteristics which permit their use in many instances barred to other quaternary ammonium compounds.

The diquaternary ammonium compounds of this invention and the method for their preparation may be more fully understood from the following examples which are set forth by way of illustration and not by way of limitation. Parts by weight are used throughout.

*Example 1*

There are added to a reaction vessel 5.45 parts of 2-dimethylaminoethyl 5-dimethylamino-3-pentenyl ether, 11.9 parts of octylbenzyl chloride, and 20 parts of acetonitrile. The mixture is heated at reflux for 12 hours and then the solvent is removed by distillation on a vacuum steam bath. The crude product is washed with heptane and recrystallized from ethyl acetate. The product corresponds to the compound having the formula

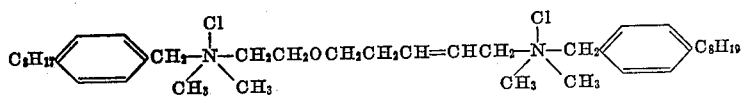

The same product is obtained when octylbenzyldimethylamine is reacted with 2-chloroethyl 5-chloro-3-pentenyl ether, in an analogous way.

Example 2

A mixture of 51 parts of hexylbenzyl bromide, 24.2 parts of 2-morpholinoethyl 5-dimethylamino-3-pentenyl ether, and 90 parts of nitromethane is heated at 80° to 88° C. for twenty hours. The solvent is removed by stripping under reduced pressure leaving the product which is identified as the compound having the formula

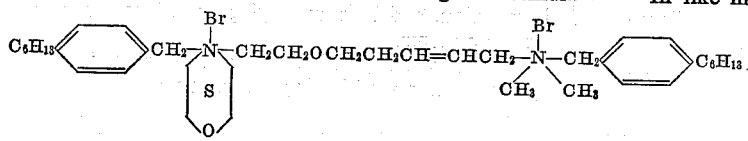

In a similar manner, there is made the compound having the formula

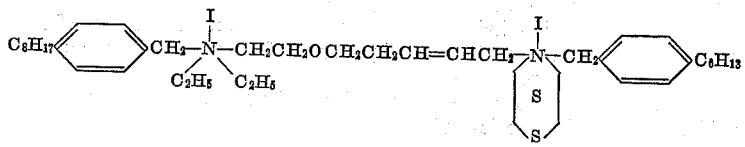

by reacting octylbenzyl iodide with 2-diethylaminoethyl 5-thiamorpholino-3-pentenyl ether.

Example 3

There are introduced into a reaction vessel 44.9 parts of heptylbenzyl chloride, 25.2 parts of 2-piperidinoethyl 5-methylethylamino-3-pentenyl ether, and 100 parts of isopropanol. The mixture is heated at reflux for a period of ten hours and then the isopropanol is stripped off. The product is washed with hexane and dried on a steam bath. The product is identified as the compound having the formula

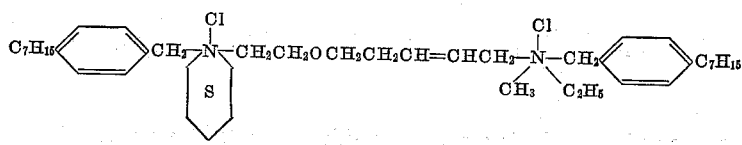

In like manner, there is made from octylbenzylpyrrolidine and 2-bromoethyl 5-chloro-3-pentenyl ether the compound having the formula

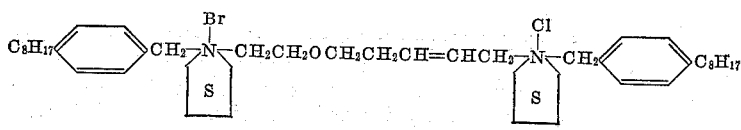

Example 4

A mixture of 55 parts of octylbenzyldiethylamine, 22.8 parts of 2-chloroethyl 5-bromo-3-pentenyl ether, and 80 parts of acetonitrile is heated at 60° to 75° C. for eleven hours. The acetonitrile is removed by distillation at reduced pressure leaving the product which is identified as the compound having the formula

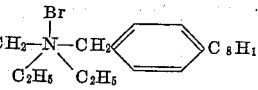

In like manner, there is prepared by reacting hexylbenzyldimethylamine and 2-bromoethyl 5-iodo-3-pentenyl ether the compound having the formula

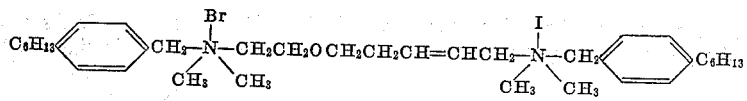

Example 5

There are mixed together 57.8 parts of octylbenzylmorpholine, 27.5 parts of 2-chloroethyl 5-iodo-3-pentenyl ether, and 85 parts of dimethylformamide. The mixture is heated at 105° to 120° C. for eight hours. The solvent is stripped off at reduced pressure leaving the product which is washed with heptane, dried, and identified as the compound having the formula

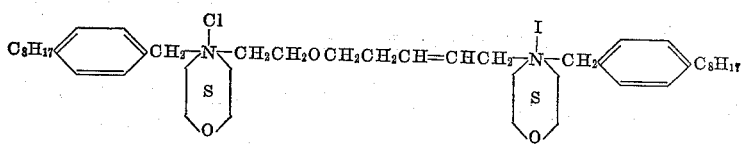

There is made in an analogous manner, the compound having the formula

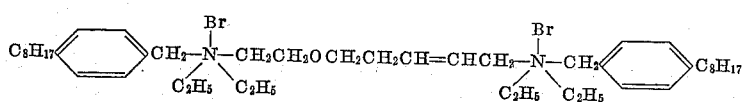

by reacting octylbenzyldiethylamine and 2-bromoethyl 5-bromo-3-pentenyl ether.

*Example 6*

There is prepared the compound having the formula

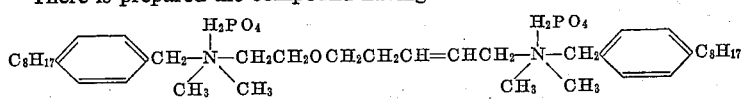

by passing the corresponding chloride form of the diquaternary ammonium through a bed of chloromethylated and aminated styrene-divinylbenzene anion-exchange resin in free base form and then titrating with phosphoric acid.

The same compound is prepared by first converting the anion-exchange resin to the phosphate form and then passing the chloride form of the diquaternary ammonium compound through a bed of the anion-exchange resin in phosphate form. The corresponding sulfate compound is made in a similar way by using sulfuric acid or the sulfate form of the anion-exchange resin instead of the phosphate counterparts above.

I claim:

1. As a new composition of matter, the diquaternary ammonium compound having the formula

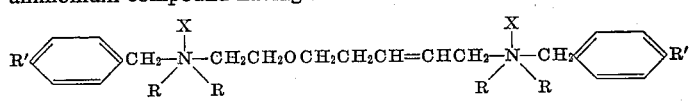

in which R' is an alkyl group of six to eight carbon atoms, X is an anion, and the R groups taken individually represent alkyl groups of no more than two carbon atoms and taken collectively, in proximate pairs, represent a divalent saturated aliphatic chain of α,ω-divalency having four to five carbon atoms which jointly with the proximate nitrogen atom forms a five- to six-sided monoheterocyclic amine from the class consisting of morpholino, thiamorpholino, pyrrolidinyl, and piperidine, and those groups having a lower alkyl substituent.

2. As a new composition of matter, the diquaternary ammonium compound having the formula

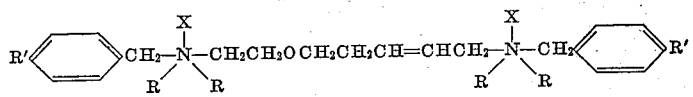

in which R' is an alkyl group of six to eight carbon atoms, X is an anion, and R is an alkyl group of no more than two carbon atoms.

3. As a new composition of matter, the diquaternary ammonium compound having the formula

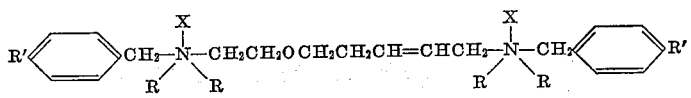

in which R' is an alkyl group of six to eight carbon atoms, X is a halogen having an atomic weight of about 35.5 to 127, and R is an alkyl group of no more than two carbon atoms.

4. As a new composition of matter, the compound having the formula

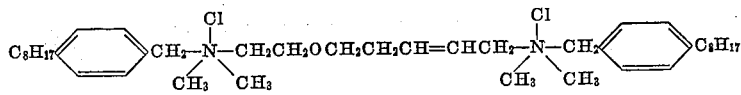

5. As a new composition of matter, the compound having the formula

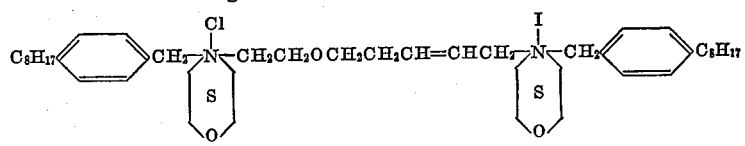

6. As a new composition of matter, the compound having the formula

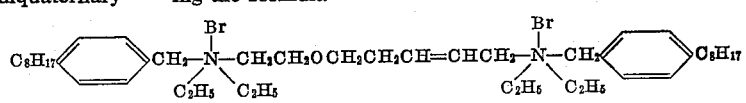

7. As a new composiiton of matter, the compound having the formula

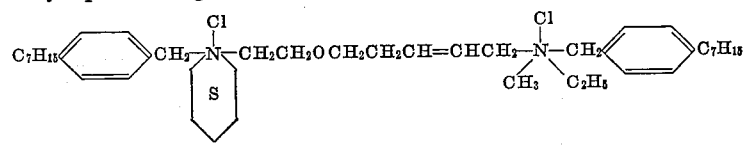

8. As a new composition of matter, the compound having the formula

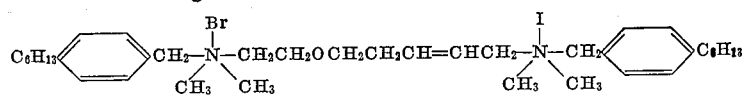

9. A method for the preparation of a diquaternary ammonium compound having the formula

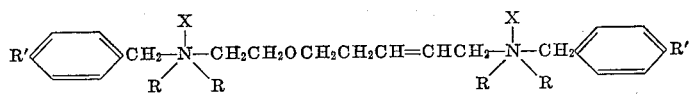

in which R' is an alkyl group of six to eight carbon atoms, X is an anion, and the R groups taken individually represent alkyl groups of no more than two carbon atoms and taken collectively, in proximate pairs, represent a divalent saturated aliphatic chain of α,ω-divalency having four to five carbon atoms which jointly with the proximate nitrogen atom forms a five- to six-sided monoheterocyclic amine from the class consisting of morpholino, thiamorpholino, pyrrolidinyl, and piperidine, and those groups having a lower alkyl substituent which comprises bringing together at a reacting temperature in the range of about 50° C. to the reflux temperature in the presence of an inert volatile solvent a compound having the formula

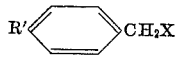

with a compound having the formula

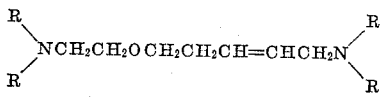

10. A method for the preparation of a diquaternary ammonium compound having the formula

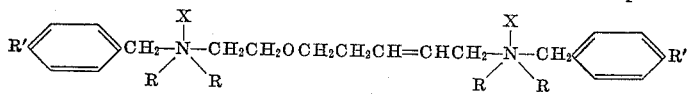

in which R' is an alkyl group of six to eight carbon atoms, R is an alkyl group of no more than two carbon atoms, and X is a halogen having an atomic weight of about 35.5 to 127, which comprises bringing together at a reacting temperature in the range of about 50° C. to the reflux temperature in the presence of an inert volatile solvent a compound having the formula

with a compound having the formula

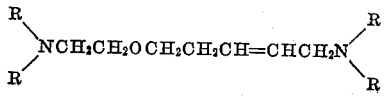

11. A method for the preparation of a diquaternary ammonium compound having the formula

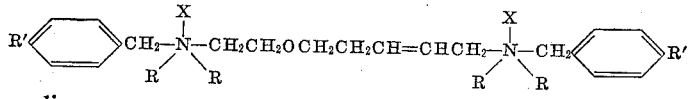

in which R' is an alkyl group of six to eight carbon atoms, R is an alkyl group of no more than two carbon atoms, and X is an anion, which comprises bringing together at a reacting temperature in the range of about 50° C. to the reflux temperature in the presence of an inert volatile solvent an alkylbenzyl halide and a dialkylaminoethyl dialkylaminopentenyl ether to form a diquaternary ammonium compound in halide form and then passing said compound through an anion-exchange resin free of halide ion to exchange the halide ion for a non-halide ion.

12. A method for the preparation of a diquaternary ammonium compound having the formula

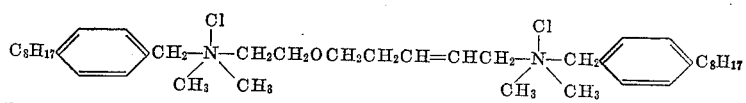

which comprises bringing together at a reacting temperature in the range of about 60° to 125° C. in the presence of an inert volatile solvent octylbenzyl chloride and dimethylaminoethyl 5 - dimethylamino - 3 - pentenyl ether.

13. A method for the preparation of a diquaternary ammonium compound having the formula

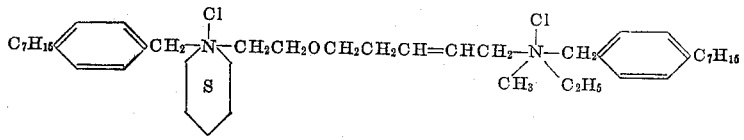

which comprises bringing together at a reacting temperature in the range of about 60° to 125° C. in the presence of an inert volatile solvent heptylbenzyl chloride and 2-piperidinoethyl 5-methylethylamino-3-pentenyl ether.

References Cited in the file of this patent

UNITED STATES PATENTS 2,560,280     De Benneville _____ July 10, 1951